May 9, 1944.    F. BELDI    2,348,239
HIGH VOLTAGE TRANSFORMER
Filed June 28, 1941
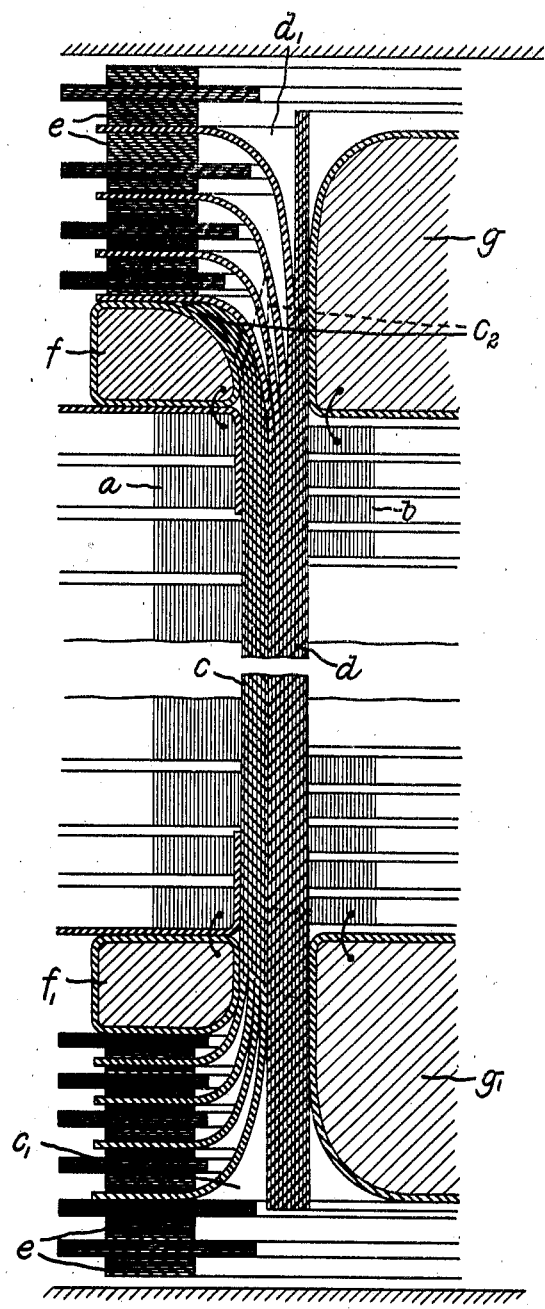
Inventor:
Fritz Beldi
By Pierce & Scheffler
Attorneys.

Patented May 9, 1944

2,348,239

UNITED STATES PATENT OFFICE 2,348,239

HIGH VOLTAGE TRANSFORMER

Fritz Beldi, Baden, Switzerland, assignor to Aktiengesellschaft Brown, Boveri & Cie, Baden, Switzerland, a joint-stock company Application June 28, 1941, Serial No. 400,316
In Germany July 29, 1940

3 Claims. (Cl. 175—356)

In the known forms of transformer construction the insulation between the windings of different potential consisting of insulating shells and caps with intermediate oil-filled spaces can be replaced by an insulation bandage of rigid gas-proof insulating material. Difficulties are, however, encountered as regards the control of the field and voltage conditions at the point where the insulation projects beyond the windings. In order to prevent insulation breakdowns at the ends of the windings large insulating spaces have to be provided which result in an undesirable increase in the height of the transformer. Protective end rings for producing a uniform field distribution at the end of the windings are not sufficient to bring about an appreciable improvement in the aforementioned conditions. The insulation problem can, however, be solved in a satisfactory manner if the insulating cylinder between the windings is made of rigid layers of insulating material and these layers are bent over at the ends to form flanges which screen or cover at least one winding. Breakdowns at the insulation ends and flashovers are thus avoided. The work entailed in bending the layers of the wound insulating cylinder in order to form the flanges considerably increases the time required for the assembly of the transformer. This is due to the fact that first of all the flange must be bent at one end of the insulating cylinder, then the finished winding mounted on the insulating cylinder, and finally the flange bent at the other end of the cylinder. If subsequently a defect occurs in the winding this latter can only be removed by damaging the entire insulation.

The present invention concerns a high-voltage transformer with insulation between the windings consisting of rigid layers of insulating material in the form of cylinders which are bent over at their ends to form flanges covering at least one winding, the axial thickness of said flanges being greater than the radial thickness of the insulating cylinder walls, and in which the aforementioned disadvantages are overcome by building up the insulation of telescopic parts pushed into each other, said parts each comprising a cylinder of which one end has a bent-over flange.

A constructional example of the invention is illustrated diagrammatically in the drawing where the windings and insulation of a transformer are shown in longitudinal section, all parts which are not essential for an understanding of the invention having been omitted from the figure.

The high and low voltage windings are designated by $a$ and $b$ respectively. The insulation between these windings is composed of the cylinders $c$, $d$ which fit telescopically into each other and at one end of which are the flanges $c_1$, $d_1$ formed by bending over the layers of insulating material. The necessary thickness for the flanges is obtained by the insertion of distance pieces $e$ and if necessary additional insulating discs. At the ends of the windings protective rings $f$, $f_1$ and $g$, $g_1$ are located for controlling the field, these rings being embedded in insulating material. The flanges of the insulating cylinders cover the high-voltage winding and the protective end rings, it being assumed that the high-voltage winding $a$ is the outer winding. Furthermore it is assumed that the voltage conditions are such that for the production of the flanges a total thickness equal to 40% of the insulation thickness between the windings is adequate. The wall thickness of the outer insulating cylinder $c$ is thus 40% and that of the inner cylinder $d$ 60% of the total thickness of insulation. The remaining 20% of the total insulation which is not required for the formation of the flange of the inner cylinder $d$ can as shown in the figure be left as part of the cylinder or also bent over to form a flange.

According to the invention it is thus possible to construct both cylinders $c$ and $d$ together with their flanges $c_1$, $d_1$ simultaneously, instead one after the other as was previously the case. The insulating cylinders can be fitted on to the finished winding from opposite ends and slide into each other telescopically. By this means the construction of the insulation is greatly simplified and a considerable saving in time is achieved when assembling and dismantling the transformer.

When the insulating cylinders $c$, $d$ having a flange at one end only are fitted into each other telescopically, a dangerous free space bounded by the protective end ring $f$, the flange $d_1$ above this ring and the flange-free end of the insulating cylinder $c$, would be formed. In order to fill up this space the flangeless end of the cylinder $c$ is made with a sharpened or tapered edge as indicated by the broken lines at $c_2$ in the drawing. This sharpened edge of the cylinder $c$ is bent over after the former is fitted into the cylinder $d$. The layers of insulating material are not covered with an adhesive material at the flangeless end so as to facilitate the bending process. This bending of the sharpened edge can be further helped by providing the ends of the layers with longitudinal slits.

The thickness of the cylinder walls and the number of layers of insulating material used is quite optional and not restricted to the values given for the embodiment of the invention illustrated. Instead of two cylinders, any number of cylinders can be used, these being fitted into each other telescopically and in such a manner that the cylinder whose flangeless end is covered by a flange of an adjoining cylinder is provided with a tapered edge at the flange-free end, this edge being bent over in such a manner that the space formed by the flange of the adjoining cylinder, its flange-free end and the protective end ring or both neighbouring cylinders, is filled up.

I claim:

1. In a high voltage transformer comprising concentric high and low voltage windings having an annular gap therebetween, a cylindrical laminated paper insulation structure completely filling the gap between said windings, said insulation structure including a plurality of cylinders of laminated construction telescoped into said annular space alternately from the opposite ends thereof and having end portions extending beyond the ends of the windings, each said telescoping cylinders having one end at which the laminations thereof are in close engagement and an opposite end at which the laminations thereof separated and spread out progressively from a point adjacent the end of the high voltage winding to the respective ends thereof to form a plurality of integral axially spaced annular flange elements extending radially from the body of the cylinder over one end of the high voltage winding, the closely engaged laminated end of each cylinder being adjacent the spread-out laminated end of an adjoining cylinder, the closely engaged laminated end of one of said telescoping cylinders being tapered and belled outwardly to lie adjacent the inner annular flange element on the end of the next adjacent inner cylinder and to fill the gap between the latter and the adjacent part of the transformer.

2. In a high voltage transformer comprising concentric high and low voltage windings having an annular gap therebetween, a cylindrical laminated insulation structure completely filling the gap between said windings, said insulation structure comprising a pair of laminated insulating cylinders telescoped into each other from opposite ends and having end portions extending beyond the ends of the windings, one end portion of each of said cylinders having its laminations separated and spread out progressively from a point adjacent the end of the outer winding to form a plurality of integral axially spaced radially extending annular flange elements overlying the ends of the outer winding, the flanged end portion of each cylinder being adjacent the unflanged edge portion of the other cylinder, and the unflanged end portion of the outer cylinder being turned outwardly to underlie and fill the space adjacent the inner flange element of the inner cylinder.

3. An insulating structure for a high voltage transformer having concentric high and low voltage windings with an annular gap therebetween comprising a pair of laminated insulating cylinders each having its laminations adjacent one end separated and spread out progressively to form a plurality of axially spaced radially extending annular flanges, said cylinders being telescoped into each other from opposite ends of said gap to fill the same and with the flanged ends thereof disposed at opposite ends of and overlying the ends of the outer one of said windings, the outer one of said cylinders having its other end expanded by engagement with the inner flange of the inner cylinder to fill the space between said last mentioned flange and the adjacent concentric part of the transformer.

FRITZ BELDI.